United States Patent [19]

Seeger et al.

[11] 3,901,927

[45] Aug. 26, 1975

[54] 2-(4-BIPHENYLYL)-TETRAHYDROFURANS

[75] Inventors: Ernst Seeger; Helmut Teufel; Wolfhard Engel; Josef Nickl, all of Biberach an der Riss, Germany

[73] Assignee: Boehringer Ingelheim GmbH, Ingelheim am Rhein, Germany

[22] Filed: Aug. 13, 1973

[21] Appl. No.: 387,803

[30] Foreign Application Priority Data

Aug. 17, 1972 Germany............................ 2240438

[52] U.S. Cl... 260/346.1 R; 260/515 R; 260/515 A; 260/618 R; 424/285
[51] Int. Cl............................................. C07d 5/04
[58] Field of Search................................. 260/346.1

[56] References Cited
UNITED STATES PATENTS 2,251,835  8/1941  Reppe et al..................... 260/346.1

*Primary Examiner*—Harry I. Moatz
*Attorney, Agent, or Firm*—Hammond & Littell

[57] ABSTRACT

2-(4-biphenylyl)-tetrahydrofurans of the formula

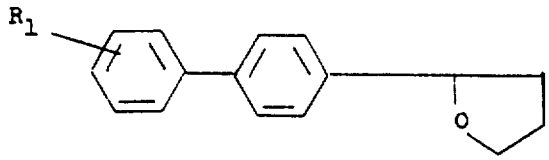

wherein $R_1$ is hydrogen or halogen; as well as methods of combatting inflammation utilizing an antiphlogistic amount of the 2-(4-biphenylyl)-tetrahydrofurans.

4 Claims, No Drawings

2-(4-BIPHENYLYL)-TETRAHYDROFURANS

OBJECTS OF THE INVENTION

An object of the present invention is the development of novel antiphlogistically active 2-(4-biphenylyl)-tetrahydrofurans.

Another object of the invention is the development of a compound of the formula

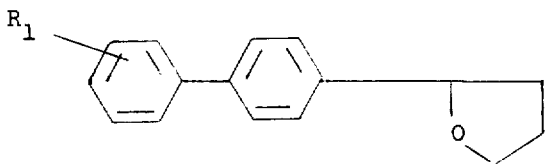

wherein $R_1$ represents a member selected from the group consisting of hydrogen and halogen.

A further object of the invention is the development of a method of counteracting inflammation in a warmblooded animal, which comprises administering to said animal an effective antiphlogistic amount of one or more of the above 2-(4-biphenylyl)-tetrahydrofurans.

These and other objects of the invention will become more apparent as the description thereof proceeds.

DESCRIPTION OF THE INVENTION

The invention relates to new 2-(4-biphenylyl)-tetrahydrofurans of General Formula I,

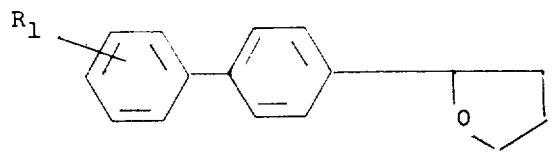

(I)

wherein $R_1$ represents a hydrogen or halogen, and to processes for their utilization. The compounds of General Formula I have valuable pharmacological properties, especially a good antiphlogistic activity. They may, however, also be used as starting materials for the preparation of pharmacologically valuable compounds, especially of antiphlogistically active compounds, for example, the preparation of 4-biphenylyl-butanols.

The compounds of General Formula I may be prepared according to the following methods:

Method A

A 4-(4-biphenylyl)-1,4-butandiol of General Formula II,

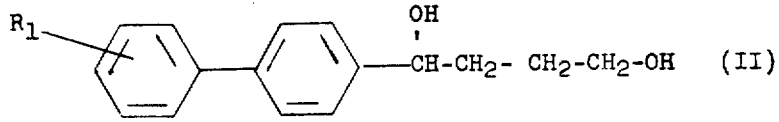

wherein $R_1$ is as hereinbefore defined, is treated with a cyclodehydrating agent at temperatures between 10° and 250°C.

The reaction may be carried out in the absence of a solvent. Preferably, however, the reaction is carried out in the presence of an inert water-immiscible solvent. Suitable solvents include hydrocarbons like benzene, toluene or xylene. In some cases it is of advantage to operate at reflux using a water separatory condenser. The preferred reaction temperature is between 80° and 120°C.

The cyclodehydrating agents which may be used are, for example, inorganic or organic acids, such as phosphoric acid, sulfuric acid, p-toluenesulfonic acid, oxalic acid, or acidically reacting salts like potassium hydrogen sulfate or hydrogen halide salts of pyridine, as well as anhydrous metal salts like zinc chloride or also sulfonic acid halogenides in the presence of tertiary organic bases like pyridine or cationic exchanger resins, containing sulfonic acid groups.

When using pyridine hydrochloride and p-toluenesulfonic acids, 4-(4-biphenylyl)-3-butenols may be obtained as by-products, which may be removed by column chromatography.

The starting compounds of General Formula II may, for example, be obtained by reduction of 4-(4-biphenylyl)-4-oxo-butyric acid esters with complex hydrides. Especially lithium aluminum hydride at room temperature and in the presence of a suitable solvent, e.g. diethylether or dioxane, may be used. The starting compounds of General Formula II are further described in the copending U.S. Pat. application Ser. No. 295,880, filed Oct. 10, 1972.

Method B

The compounds of General Formula I may also be prepared by cyclization of 4-(4-biphenylyl-3-butenols of General Formula III,

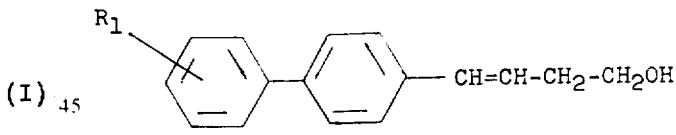

(III)

wherein $R_1$ is defined as above, by means of acid agents at temperatures between 50° and 200°C.

Especially suitable as acid agents are sulfuric acid, p-toluene-sulfonic acid, potassium hydrogen sulfate and zinc chloride. In some cases it might be advantageous to carry out the reaction in an inert solvent such as toluene, xylene or benzene. The starting compounds of General Formula II may be obtained, for example, from correspondingly substituted 4-(4-biphenylyl)-3-butenoic acids by catalytic reduction of the carboxyl by means of complex hydrides such as lithium-aluminum hydride, lithium boron hydride, sodium-bis-(2- methoxy-ethoxy)-dihydroaluminate, in tetrahydrofuran at room temperature.

The 4-(4-biphenylyl)-3-butenoic acids may themselves be prepared, for example, by splitting off of water from corresponding well known 4-(4-biphenylyl)-4-hydroxybutyric acids in the presence of hydrogen halide salts of tertiary organic bases. The splitting off of water can be effected at temperatures between 140° and 200° C. The tertiary organic bases which may be used are, for example, pyridine and alkyl pyridines. The hydrogen halide utilizable is, for example, hydrogen chloride. The 4-(4-biphenylyl)-3-butenoic acids are further described in the copending U.S. Pat. application Ser. No. 289,008, filed Sept. 14, 1972, and the starting compounds of General Formula III are further described in the copending U.S. Pat. application Ser. No. 387,802, filed concurrently herewith, now U.S. Pat. No. 3,859,256. As already above mentioned, the compounds of General Formula I have valuable pharmacological activities, especially a good antiphlogistic activity. The compounds of General Formula I may also serve as starting materials for the preparation of antiphlogistically active 4-(4-biphenylyl)-butanols, e.g. 4-(2'-fluoro-4-biphenylyl)-butanol.

For pharmaceutical application, the new compounds of General Formula I may be incorporated into the usual pharmaceutical compositions, optionally in combination with other active ingredients of General Formula I. The single dose amounts from 50 to 400 mg, preferably from 100 to 300 mg, the daily dose amounts from 100 to 1,000 mg, preferably from 150 to 600 mg.

The following examples further illustrate the invention without being limitative in any manner.

EXAMPLE 1

2-(2'-Fluoro-4-biphenylyl)-tetrahydrofuran by Method A 6.5 gm (0.025 mol) of 1-(2-fluoro-4-biphenylyl)-1,4-butandiol (m.p.: 87° to 88°C) were refluxed for 30 minutes with 0.5 gm of p-toluenesulfonic acid in 80 ml of toluene using an apparatus incorporating a water separatory condenser. After cooling, the mixture was diluted with ether, washed with water, then washed with sodium hydrogen carbonate solution and again with water, dried over sodium sulfate and the solvent was distilled off. The remaining residue was distilled (b.p.$_{0.2}$: 130° to 131°C). The 2-(2'-fluoro-4-biphenylyl)-tetrahydrofuran crystallized and melted after recrystallization from petroleum ether at 34° to 35°C yielding 5.6 gm (92.4 percent of theory). It was identified to be the compound of the formula

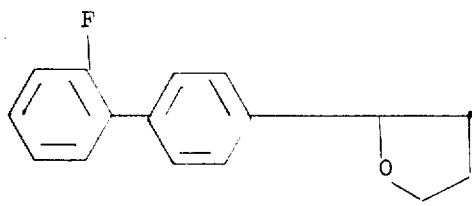

EXAMPLE 2

2-(2'-Fluoro-4-biphenylyl)-tetrahydrofuran 6.5 gm (0.025 mol) of 1-(2'-fluoro-4-biphenylyl-1,4-butandiol were refluxed for 30 minutes in 80 ml of benzene under addition of 3.8 gm (0.025 mol) of anhydrous zinc chloride using an apparatus incorporating a water separatory condenser. The further processing is described in Example 1. The tetrahydrofuran was obtained of m.p. 34° to 35°C in a yield of 89.2 percent of theory.

EXAMPLE 3

2-(2'-Fluoro-4-biphenylyl)-tetrahydrofuran

Preparation according to Example 2, however, by use of 0.2 ml of 89 percent phosphoric acid, yielding tetrahydrofuran of m.p. 34°C (97.5 percent of theory).

EXAMPLE 4

2-(2'-Fluoro-4-biphenylyl)-tetrahydrofuran 6.5 gm (0.025 mol) of 1-(2'-fluoro-4-biphenylyl)-1,4-butandiol together with 0.2 ml of concentrated sulfuric acid dissolved in 80 ml of benzene were refluxed for 10 minutes and the mixture was then treated as described in Example 1, yielding 5.6 gm (92.6 percent of theory) of 2-(2'-fluoro-4-biphenylyl)-tetrahydrofuran of m.p. 33° to 34°C.

EXAMPLE 5

2-(2'-Fluoro-4-biphenylyl-tetrahydrofuran 13 gm (0.05 mol) of 1-(2'-fluoro-4-biphenylyl)-1,4-butandiol were dissolved in 150 ml of absolute toluene, then refluxed for 30 minutes under addition of 6.8 gm (0.05 mol) of potassium hydrogen sulfate using an apparatus incorporating a water separatory condenser and treated as in Example 1.

Yield: 10 gm (82.6 percent of theory) of 2-(2'-fluoro-4-biphenylyl)-tetrahydrofuran of b.p.$_{0.2}$: 130° to 131°C (m.p.: 33° to 34°C).

EXAMPLE 6

2-(4-Biphenylyl)-tetrahydrofuran 18.2 gm (0.075 mol) of 1-(4-biphenylyl)-1,4-butandiol (m.p. 79°C) and 10.2 gm (0.075 mol) of potassium hydrogen sulfate were refluxed for 30 minutes in 150 ml of absolute toluene using an apparatus incorporating a water separatory condenser. The preparation was then effected according to Example 1.

Yield: 10 gm (59.4 percent of theory) of 2-(4-biphenylyl)-tetrahydrofuran of b.p.$_{0.1}$: 122° to 123°C. It was identified to be the compound of the formula

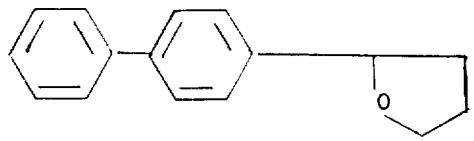

EXAMPLE 7

2-(2'-Chloro-4-biphenylyl)-tetrahydrofuran 8.3 gm (0.03 mol) of 1-(2'-Chloro-4-biphenylyl-1,4-butandiol (m.p. 88° to 89°C) were refluxed for 1 hour in 200 ml of absolute toluene with 4.1 gm of potassium hydrogen sulfate using an apparatus incorporating a water separatory condenser. The preparation is carried out as described in Example 1.

Yield: 6.5 gm (87 percent of theory) of 2-(2'-Chloro-4-biphenylyl)-tetrahydrofuran of b.p.$_{0.1}$: 133°C and m.p. 52° to 53°C (from petroleum ether). It was identified to be the compound of the formula

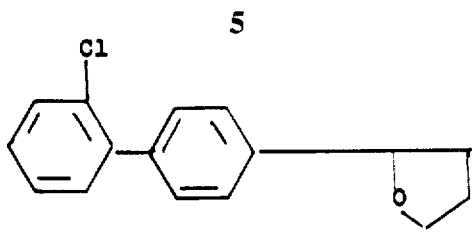

EXAMPLE 8

2-(2'-Fluoro-4-biphenylyl)-tetrahydrofuran 3.25 gm (0.0125 mol) of 1-(2'-fluoro-4-biphenylyl)-1,4-butandiol were refluxed for 30 minutes with 2.48 gm (0.013 mol) of p-toluene-sulfonic acid chloride and 1.11 gm (0.014 mol) of pyridine in 80 ml of absolute toluene. The residue, obtained after distilling off of the solvent, was dissolved in 100 ml of methanol and this solution was made strongly alkaline by addition of 20 percent sodium hydroxide solution. After standing for 2 hours at room temperature, the reaction mixture was poured into water and extracted with ether. The solvent was distilled off from the ethereal solution, which had been washed with water and dried, whereby the 2-(2'-fluoro-4-biphenylyl)-tetrahydrofuran (m.p. 33° to 34°C) was obtained.

Yield: 1.8 gm (59.5 percent of theory)

EXAMPLE 9

2-(3'-Chloro-4-biphenylyl)-tetrahydrofuran 12.2 gm (0.044 mol) of 1-(3'-chloro-4-biphenylyl)-1,4-butandiol were heated for 2 hours with 7.5 gm (0.055 mol) of potassium hydrogen sulfate in 130 ml of xylene using an apparatus incorporating a water separatory condenser. The organic salt was filtered off while hot and the filtrate was dried. The residue was distilled in vacuo, whereupon the desired product was obtain (b.p.$_{0.05}$ 158° to 165°C) which was subsequently recrystallized from petroleum ether, yielding 9.0 gm (79.2 percent of theory) of 2-(3'-chloro-4-biphenylyl)-tetrahydrofuran of m.p. 46° to 46.5°C. It was identified to be the compound of the formula

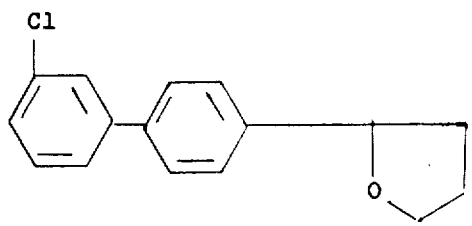

EXAMPLE 10

2-(2'-Fluoro-4-biphenylyl)-tetrahydrofuran by Method B 10 gm. of 4-(2'-fluoro-4-biphenylyl)-3-buten-1-ol (m.p. 79° to 80°C) were heated for 3 hours up to 100°C with 209 ml of 30 percent sulfuric acid while stirring. Then about 200 ml of water were added and the mixture was extracted twice with 100 ml of ether each time. The ethereal solution was washed with water several times, dried and filtered on charcoal. The solvent was distilled off, the remaining residue was triturated with petroleum ether, whereby the 2-(2'-fluoro-4-biphenylyl)-tetrahydrofuran dissolved in the petroleum ether and the unreacted solid starting compound may be filtered off. The solvent was removed from the petroleum ether solution. After the residue had been distilled, 1.5 gm of 2-(2'-fluoro-4-biphenylyl)-tetrahydrofuran were obtained (b.p.$_{0.6}$ 145° to 147°C) which crystallized after a short time and melted at 34° to 35°C.

EXAMPLE 11

2-(2'-Fluoro-4-biphenylyl)-tetrahydrofuran 1 gm. (0.0041 mol) of 4-(2'-fluoro-4-biphenylyl)-3-buten-1-ol were refluxed for 8 hours in 20 ml of toluene by addition of 0.1 gm of p-toluenesulfonic acid. After cooling, the mixture was diluted with ether, the solution was washed with water, dried over sodium sulfate and the solvent was distilled off. The remaining oily residue was distilled to medium high vacuum. The above-mentioned tetrahydrofuran was obtained of b.p.$_{0.6}$ 145° to 147°C in a yield of 0.6 gm (60 percent of theory).

EXAMPLE 12

2-(2'-Fluoro-4-biphenylyl)-tetrahydrofuran 2.42 gm (0.01 mol) of 4-(2'-fluoro-4-biphenylyl)-3-buten-1-ol were refluxed for 13 hours in 60 ml of absolute toluene after addition of 1.2 gm of potassium hydrogen sulfate. After cooling, water and ether were added, the organic solution was washed with water, dried over sodium sulfate and the solvent was distilled off. The remaining solid residue was triturated with petroleum ether and filtered. The solvent was removed from the petroleum ether solution and the remaining oily residue was distilled in medium high vacuum. 0.2 gm (8.25 percent of theory) of the above-mentioned tetrahydrofuran were obtained (b.p.$_{0.6}$ 144° to 145°C). The same result is obtained if xylene is used instead of toluene.

EXAMPLE 13

2-(2'-Fluoro-4-biphenylyl)-tetrahydrofuran 2.42 gm (0.01 mol) of 4-(2'-fluoro-4-biphenylyl)-3-buten-1-ol were refluxed for 7 hours in 30 ml of benzene after addition of 2 drops of concentrated sulfuric acid. After cooling, water and ether were added and the organic layer was separated. The organic solution was washed with water, dried, filtered on charcoal and the solvent was distilled off. Petroleum ether was added to the remaining oil, whereby the unreacted starting compound crystallized, which was subsequently filtered off. The solvent was removed from the petroleum ether solution and the remaining residue was distilled in vacuo. 0.4 gm (16.5 percent of theory) of the above-metioned tetrahydrofuran (b.p.$_{0.6}$ 144° to 145°C) were obtained.

EXAMPLE 14

Pharmacology

The following substances were tested with regard to their absolute antiphlogistic activity and their toxicity:

| | |
|---|---|
| 2-(2'-Fluoro-4-biphenylyl)-tetrahydrofuran | = A |
| 2-(4-Biphenylyl)-tetrahydrofuran | = B |
| 2-(2'-Chloro-4-biphenylyl)-tetrahydrofuran | = C |

The compounds were tested in respect to their antiexudative effect on the kaolin-induced edema and the carrageenin-induced edema of the hind paw of the rat and in respect to their acute toxicity after oral application to rats, in comparison with phenylbutazone.

a. Kaolin-induced edema of the hind paw of the rat

The kaolin edema was induced according to the method given by HILLEBRECHT (Arzneimittel-Forsch. 4, 607 (1954))by subplantary injection of 0.05 ml of a 10 percent suspension of kaolin in a 0.85 percent sodium chloride solution. Measuremennt of the volume of the paws was effected using the technique of DOEPFNER and CERLETTI (Int. Arch Allergy. Immunol. 12, 89 (1958)).

Male FW 49 rats having an average weight of 120 to 150 gm were fed with the test compounds 30 minutes before inducing the edema by means of an oesophageal tube. Five hours after the provocation of the edema the averaged values of the swelling caused in the rats treated with the test compounds were compared with values measured on control animals. By graphical extrapolation, the dose leading to a 35 percent reduction of the swelling ($ED_{35}$) was calculated from the percentage reduction values measured by the administration of different doses.

b. Carrageenin-induced edema of the hind paw of the rat

The provocation of the carrageenin edema was effected according to the method of WINTER et al. (Proc. Soc. exp. Biol. Med. 111, 544 (1962))by subplantary injection of 0.05 ml of a 1 percent solution of carrageenin in a 0.85 percent solution of sodium chloride. The test compounds were administered 60 minutes before the provocation of the edema. For the calculation of the reductive effect on the edema, the values measured 3 hours after the provocation of the edema were used. All the other details were the same as described above in the case of the kaolin-induced edema.

c. Acute toxicity

After oral administration to male and female FW 49 rats (ratio 1:1) having an average weight of 135 gm, the acute toxicity ($LD_{50}$) was determined. The compounds were fed as a trituration in Tylose. The calculation of the $LD_{50}$ values was effected, as far as possible, according to the method of LITCHFIELD and WILCOXON, based on the percentage of animals which died within 14 days after administration of the different doses.

d. Therapeutic Index

The therapeutical indices (a measure of the therapeutic usefulness) were calculated as the quotient of the $LD_{50}$ value divided by the $ED_{35}$ value deriving from the tests regarding the anti-exudative activity against the kaolin and carrageenin edemas.

The results obtained from these tests are shown in the following Table I. The above-mentioned compounds surpass the known compound phenylbutazone in their antiphlogistic activity.

As the toxicity does not run parallel with the antiphlogistic activity, the compounds concerned have a therapeutic index of at least twice that of phenylbutazone.

TABLE I

| Compound | kaolin edema $ED_{35}$ per os mg/kg | carrageenin edema $ED_{35}$ per os mg/kg | average value $ED_{35}$ mg/kg | acute toxicity in the rat | | therapeutical index ratios given by the toxic and antiexudative activity $LD_{50}/ED_{35}$ |
|---|---|---|---|---|---|---|
| | | | | mg/kg | confidence limits (95% probability) | |
| Phenyl-butazone | 58 | 69 | 63.5 | 864 | 793 – 942 | 13.6 |
| *A | 25 | 16.5 | 20.8 | 713 | 536 – 948 | 34.3 |
| *B | 33 | 46 | 39.5 | 910 | 664 – 1247 | 23.0 |
| C | 37 | 50 | 43.5 | >1800 | 2) | >41.3 |

2) after application of 1800 mg/kg per os, 2 out of 10 animals died
*The two compounds were examined as solution in sesame oil in all tests For pharmaceutical purposes the compounds according to the present invention are administered to warmblooded animals perorally or parenterally as active ingredients in customary dosage unit compositions, that is compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective antiphlogistic dosage unit of the compounds according to the present invention is from 0.83 to 6.67 mgm/kg body weight, preferably 1.33 to 5.0 mgm/kg body weight. The daily dose rate is from 1.66 to 16.7 mgm/kg body weight, preferably 2.5 to 10 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 15

Tablets with 200 mg of 2-(2'-fluoro-4-biphenylyl)-tetrahydrofuran

Composition:

1 tablet contains:

| | |
|---|---|
| Active ingredient | 200.0 mg |
| Corn starch | 97.0 mg |
| Polyvinylpyrrolidone | 10.0 mg |
| Magnesium stearate | 3.0 mg |
| | 310.0 mg |

Method of preparation 2-(2'-fluoro-4-biphenylyl)-tetrahydrofuran was mixed with corn starch, granulated with a 14 percent solution of polyvinylpyrrolidone in water, passed through a screen of 1.5 mm, dried at 45°C and passed once more through the said screen. The granulate thus obtained was mixed with magnesium stearate and pressed into tablets. Weight of tablet: 310 mg Punch: 10 mm flat.

EXAMPLE 16

Coated tablets with 200 mg of
2-(2'-fluoro-4-biphenylyl)-tetrahydrofuran

Composition:
1 coated tablet core contains:

| | |
|---|---|
| Active ingredient | 200.0 mg |
| Corn starch | 70.0 mg |
| Gelatine | 8.0 mg |
| Talcum | 18.0 mg |
| Magnesium stearate | 4.0 mg |
| | 300.0 mg |

Method of preparation:

The mixture of the 2-(2'-fluoro-4-biphenylyl)-tetrahydrofuran and the corn starch was granulated with an aqueous 10 percent solution of the gelatine through a 1.5 mm mesh screen, dried at 45°C and again passed through the screen. The granulate thus obtained was mixed with the talcum and the magnesium stearate, and the resulting composition was compressed into coated tablet cores.

Weight of core: 300.0 mg
Punch: 10 mm flat

The coated tablet cores were subsequently coated according to known processes with a thin shell consisting essentially of a mixture of talcum and sugar and finally polished with beeswax.

Weight of the coated pills: 580 mg.

EXAMPLE 17

Gelatine capsules with 200 mg of
2-(2'-fluoro-4-biphenylyl)-tetrahydrofuran

Composition:
1 gelatine capsule contains:

| | |
|---|---|
| Active ingredient | 200.0 mg |
| Corn starch | 190.0 mg |
| Colloidal silicic acid | 6.0 mg |
| Magnesium stearate | 4.0 mg |
| | 400.0 mg |

Method of preparation

The substances were intimately mixed and filled into No. 1 gelatine capsules. 1 gelatine capsule contains: 400 mg of preparation and 200 mg of 2-(2'-fluoro-4-biphenylyl)-tetrahydrofuran, an oral dosage unit with an effective antiphlogistic action.

EXAMPLE 18

Suppositories with 300 mg of
2-(4-biphenylyl)-tetrahydrofuran

Composition:
1 suppository contains:

| | |
|---|---|
| Active ingredient | 300.0 mg |
| Suppository mass-cocoa butter | |
| (e.g. Witepsol W 45) | 1450.0 mg |
| | 1750.0 mg |

Method of preparation

The finely pulverized 2-(4-biphenyl)-tetrahydrofuran was stirred into the molten suppository mass and, after cooling to 40°C, was blended by means of an immersion homogenizer and poured into slightly precooled molds at 38°C.

Weight of suppository: 1.75 gm.

EXAMPLE 19

Suspension with 200 mg of
2-(4-biphenylyl)-tetrahydrofuran

Composition:

| | |
|---|---|
| Active ingredient | 4.0 gm |
| Dioctyl sodium sulfosuccinate (DONSS) | 0.02 gm |
| Benzoic acid | 0.1 gm |
| Sodium cyclamate | 0.2 gm |
| Colloidal silicic acid | 1.0 gm |
| Polyvinylpyrrolidone | 0.1 gm |
| Glycerine | 25.0 gm |
| Grapefruit flavoring | 0.1 gm |
| Distilled Water ad | 100.0 ml |

Method of preparation

The DONSS, benzoic acid, sodium cyclamate and polyvinylpyrrolidone were dissolved in distilled water heated to 70°C. Then glycerine and colloidal silicic acid were added. The solution was cooled to room temperature and the finely pulverized 2-(4-biphenylyl)-tetrahydrofuran was suspended by means of an immersion homogenizer. Subsequently, the mixture was flavored and made up with water to the given volume. 5 ml of the suspension contains 200 mg of the active ingredient.

EXAMPLE 20

Coated tablets with 100 mg of
2-(4-biphenylyl)-tetrahydrofuran

Composition:

| | |
|---|---|
| Active ingredient | 100.0 mg |
| Lactose | 55.0 mg |
| Corn starch | 42.0 mg |
| Polyvinylpyrrolidone | 2.0 mg |
| Magnesium stearate | 1.0 mg |
| | 200.0 mg |

Method of preparation

The mixture of 2-(4-biphenylyl)-tetrahydrofuran with lactose and corn starch was granulated with an aqueous 8 percent solution of the polyvinylpyrrolidone through a 1.5 mm mesh screen, dried at 45°C and again passed through a screen of 1.0 mm mesh size. The granulate thus obtained was mixed with magnesium stearate and compressed into coated tablet cores.

Weight of core: 200 mg
Punch: 8 mm, arched

The coated tablets were coated according to known processes with a thin shell consisting essentially of a mixture of sugar and talcum and finally polished with beeswax. Weight of the coated pills: 290 mg.

While the present invention has been illustrated with the aid of certain specific embodiments thereof, it will be readily apparent to those skilled in the art that the invention is not limited to these particular embodiments. Various changes and modifications may be made without departing from the spirit of the invention or the scope of the appended claims.

We claim:

1. a compound of the formula

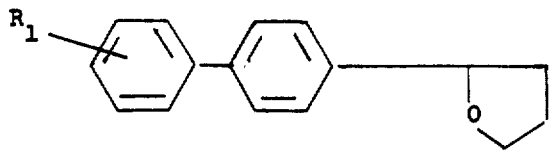

wherein $R_1$ represents a member selected from the group consisting of hydrogen and halogen.

2. The compound of claim 1 which is 2-(2'-fluoro-4-biphenylyl)-tetrahydrofuran.

3. The compound of claim 1 which is 2-(4-biphenylyl)-tetrahydrofuran.

4. The compound of claim 1 which is 2-(2'-chloro-4-biphenylyl)-tetrahydrofuran.

* * * * *